(12) United States Patent
Weir et al.

(10) Patent No.: US 12,483,855 B2
(45) Date of Patent: *Nov. 25, 2025

(54) DISTRIBUTED MUSTER FOR OCEAN-GOING VESSELS

(71) Applicant: Royal Caribbean Cruises Ltd., Miami, FL (US)

(72) Inventors: Nicholas William Emilton Weir, Davie, FL (US); Jay Schneider, Miami Beach, FL (US); Joey Hasty, Miami, FL (US)

(73) Assignee: Royal Caribbean Cruises, Ltd., Miami, FL (US)

( * ) Notice: Subject to any disclaimer, the term of this patent is extended or adjusted under 35 U.S.C. 154(b) by 100 days.

This patent is subject to a terminal disclaimer.

(21) Appl. No.: 18/504,104

(22) Filed: Nov. 7, 2023

(65) Prior Publication Data

US 2024/0163635 A1 May 16, 2024

Related U.S. Application Data

(63) Continuation of application No. 17/330,401, filed on May 25, 2021, now Pat. No. 11,812,327, which is a
(Continued)

(51) Int. Cl.
*H04W 4/021* (2018.01)
*G06Q 30/0217* (2023.01)
(Continued)

(52) U.S. Cl.
CPC ........ *H04W 4/021* (2013.01); *G06Q 30/0218* (2013.01); *H04W 4/023* (2013.01); *H04W 4/024* (2018.02); *H04W 4/42* (2018.02)

(58) Field of Classification Search
CPC ..... H04W 4/021; H04W 4/023; H04W 4/024; H04W 4/42; H04W 4/029; H04W 4/80; H04W 4/90; H04W 4/00; H04W 4/30; G06Q 30/0218; G06Q 30/0236; G06Q 50/40; G06Q 10/0639; G09B 9/00; G09B 19/00; G07C 11/00
See application file for complete search history.

(56) References Cited

U.S. PATENT DOCUMENTS

2002/0055872 A1* 5/2002 LaBrie ............... G06Q 30/0267
705/14.69
2019/0340560 A1* 11/2019 Sundia ............... G06K 7/10415

* cited by examiner

*Primary Examiner* — James J Yang
(74) *Attorney, Agent, or Firm* — CRGO Global; Steven M. Greenberg

(57) ABSTRACT

Distributed muster includes distributing to different mobile devices an identity of an assigned muster location of an ocean-going vessel, and associating each mobile device both with a corresponding passenger of the ocean-going vessel, and also with the assigned muster location. Thereafter, a timer initiates that defines a period during which a muster drill must be completed by all of the passengers and, in response, a message is transmitted to each mobile device that the muster drill has commenced. During the period, as each mobile device is sensed within a geographically defined area of a correspondingly assigned muster location, a record of the completion of the muster drill by the passenger associated with the sensed mobile device is recorded in the memory. As well, subsequent to a lapsing of the timer, a listing is displayed of any passenger not recorded as having completed the muster drill.

15 Claims, 2 Drawing Sheets

Related U.S. Application Data continuation of application No. 16/805,808, filed on Mar. 1, 2020, now Pat. No. 11,032,667, which is a continuation of application No. 16/569,627, filed on Sep. 12, 2019, now Pat. No. 10,582,335.

(51) Int. Cl.
*H04W 4/02* (2018.01)
*H04W 4/024* (2018.01)
*H04W 4/42* (2018.01)

DISTRIBUTED MUSTER FOR OCEAN-GOING VESSELS

CROSS-REFERENCE TO RELATED APPLICATIONS

This application is a Continuation of U.S. patent application Ser. No. 17/330,401, filed May 25, 2021, now granted U.S. Pat. No. 11,812,327, which is a Continuation of U.S. patent application Ser. No. 16/805,808, filed Mar. 1, 2020, now granted U.S. Pat. No. 11,032,667, which is a Continuation of U.S. patent application Ser. No. 16/569,627, filed Sep. 12, 2019, now granted U.S. Pat. No. 10,582,335, the entirety of which is incorporated herein by reference.

BACKGROUND OF THE INVENTION

Field of the Invention

The present invention relates to the field of muster drill management in an ocean-going vessel and more particularly to coordinating passenger muster in a cruise ship.

Description of the Related Art

Muster refers to the organized and pre-planned congregation of different passengers on an ocean-going vessel at different locations of the ocean-going vessel in preparation for a response to an emergency condition in the ocean-going vessel. Traditionally, in the context of a passenger cruise ship, a muster drill is performed at the beginning of the cruise before the cruise ship departs or shortly thereafter. During the muster drill, each individual passenger reports to an assigned muster station—a specific location on the vessel. A crew member then confirms the presence of each passenger expected to be present at the specific location during the muster drill so that all passengers may be accounted for in the event of an actual emergency and a resultant actual muster.

Muster drills are particularly important because, with different clusters of passengers pre-positioned at specific, predetermined locations, an orderly evacuation of the vessel may be achieved if required, or at least all passengers can be accounted for and the location of the passengers managed relative to a location of an emergency condition aboard the vessel. Muster drills also are important as the muster drill introduces to each passenger the precise location at which the passenger is required to report in the event of an actual emergency as well as demonstrates important safety information such as the identification of life jackets and warning signals the guest might hear. Consequently, despite the prospective frenetic activity of an actual muster during an emergency, there is some confidence that the passenger will be able to traverse the vessel to the assigned muster station.

For many cruise passengers, the muster drill is viewed as a necessary annoyance. Further, the muster drill can be confusing for some—particularly the elderly and children—both of whom often require additional assistance locating and moving towards assigned muster stations. Crew members generally are trained to supply such assistance, but lapses remain possible. To the extent that the intent of the muster drill, in part, is to make each passenger aware of the assigned muster station, performing the muster drill for many thousands of passengers, all at once, may create unnecessary confusion or missed opportunities to educate and inform, in light of the ultimate goal.

BRIEF SUMMARY OF THE INVENTION

Embodiments of the present invention address deficiencies of the art in respect to muster and provide a novel and non-obvious method, system and computer program product for distributed muster for ocean-going vessels. In an embodiment of the invention, for each of a multiplicity of different mobile devices, an identity of a correspondingly assigned muster location of the ocean-going vessel is distributed to the mobile computing device by way of a computer communications network. In this regard, each of the different mobile computing devices may be associated in memory of a computing system, both with a corresponding passenger amongst a set of passengers of the ocean-going vessel, and also with the assigned one of the muster locations. Thereafter, a timer initiates, the timer defining a period during which a muster drill must be completed by all of the passengers in the set. In response to the timer, a message is transmitted to each of the mobile devices that the muster drill has commenced.

During the period defined by the timer, as each one of the mobile devices is sensed within a geographically defined area of a correspondingly assigned different one of the muster locations, a record of the completion of the muster drill by the corresponding passenger of the one of the mobile devices may be recorded in the memory. As well, subsequent to a lapsing of the timer indicating a completion of the muster drill, a listing may be displayed in a display of the computing system, of any of the set of passengers not recorded in the memory as having completed the muster drill. In this way, the performance of the muster drill may be conducted in a distributed fashion over a period of time so as to reduce unnecessary chaos and so as to not overburden the entirety of the passengers with a specified singular moment in time when the muster drill must occur.

In one aspect of the embodiment, the method additionally includes detecting a proximity of one of the mobile devices to a corresponding one of the muster locations assigned to one of the set of passengers associated with the mobile device, while the mobile device remains outside of the geographically defined area of the corresponding one of the muster locations. In response, a prompt may be displayed in a user interface of the mobile device, the prompt prompting the corresponding passenger to enter into the geographically defined area of the corresponding one of the muster locations so as to satisfy the muster drill. In another aspect of the embodiment, video playback of a muster drill video may be displayed within a user interface of each of the mobile devices prior to the initiation of the timer. Thereafter, as each one of the mobile devices is sensed within the geographically defined area of the corresponding one of the muster locations, a presentation is displayed within the user interface of a set of questions pertaining to the muster drill video in the user interface. Finally, for each mobile device sensed within the geographically defined area, answers received for the set of questions are scored. Optionally, it may be determined that the scored answers for one of the mobile devices exceeds a threshold value, so that a voucher for a reward may be transmitted to the one of the mobile devices.

In yet another aspect of the embodiment, a position of each one of the mobile devices may be located during the period defined by the timer for the muster drill. As such, for each one of the mobile devices, a navigation route may be computed from the located position to a correspondingly assigned one of the muster locations. Consequently, for each one of the mobile devices, the navigation route is displayed in a user interface therein.

Finally, in even yet another aspect of the embodiment, during the period defined by the timer, a button control is displayed within a user interface of each of the mobile devices. The button control is configured to transmit a message requesting assistance during the muster drill. Consequently, during the muster drill, the message may be received from one of the mobile devices, a position located of the mobile device, and a crew member mobile device nearest to the position identified. Finally, the position and an identity of a passenger corresponding to the mobile device may be transmitted to the crew member mobile device.

In another embodiment of the invention, a data processing system is adapted for distributed muster for ocean-going vessels. The system includes a host computing system of one or more computers, each with memory and at least one processor. The host computing system is communicatively coupled over a computer communications network to a multiplicity of different mobile devices. The system further includes a data store coupled to the host computing system, the data store storing in a database, a set of records, each of the records associating a passenger on a specific ocean-going vessel both with a corresponding one of the mobile devices, and also a particular one of a multiplicity of muster locations on the specific ocean-going vessel.

Notably, the system also includes a distributed muster module. The module includes computer program instructions executing in the memory of the host computing system. The computer program instructions in turn, are enabled during execution in the memory of the host computing system, to distribute to each of the different mobile devices, by way of the computer communications network, an identity of an assigned one of a multiplicity of muster locations and thereafter, to initiate a timer in the memory, the timer defining a period during which a muster drill must be completed by each passenger on the specific ocean-going vessel. The program instructions further are enabled to transmit a message to each of the mobile devices, that the muster drill has commenced in response to the timer. Then, during the period defined by the timer, as each one of the mobile devices is sensed within a geographically defined area of a correspondingly assigned different one of the muster locations, the program instructions record in the memory a completion of the muster drill by the corresponding passenger of the one of the mobile devices. Finally, subsequent to a lapsing of the timer indicating a completion of the muster drill, the program instructions display in a display of the computing system, a listing of any of the set of passengers not recorded in the memory as having completed the muster drill. As well, targeted instructions may be transmitted to specific ones of the passengers after the completion of the muster drill Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for distributed muster for ocean-going vessels. In accordance with an embodiment of the invention, different muster locations are assigned to different passengers of an ocean-going vessel, and the identity of an assigned muster location is distributed to a mobile device of each corresponding passenger. A timer is then initiated that defines a period during which a muster drill must be completed by all of the passengers, in response to which, a message is transmitted to each mobile device that the muster drill has commenced. During the period, as each mobile device is sensed within a geographically defined area of a correspondingly assigned muster location, a record of the completion of the muster drill by the passenger associated with the sensed mobile device is recorded in the memory. Once the period has lapsed according to the timer, a listing is displayed of any passenger not recorded as having completed the muster drill. In this way, the process of performing the muster drill may be distributed across a period of time so as to relieve the burden of an all-at-once effort of a traditional muster drill.

Figure 1:
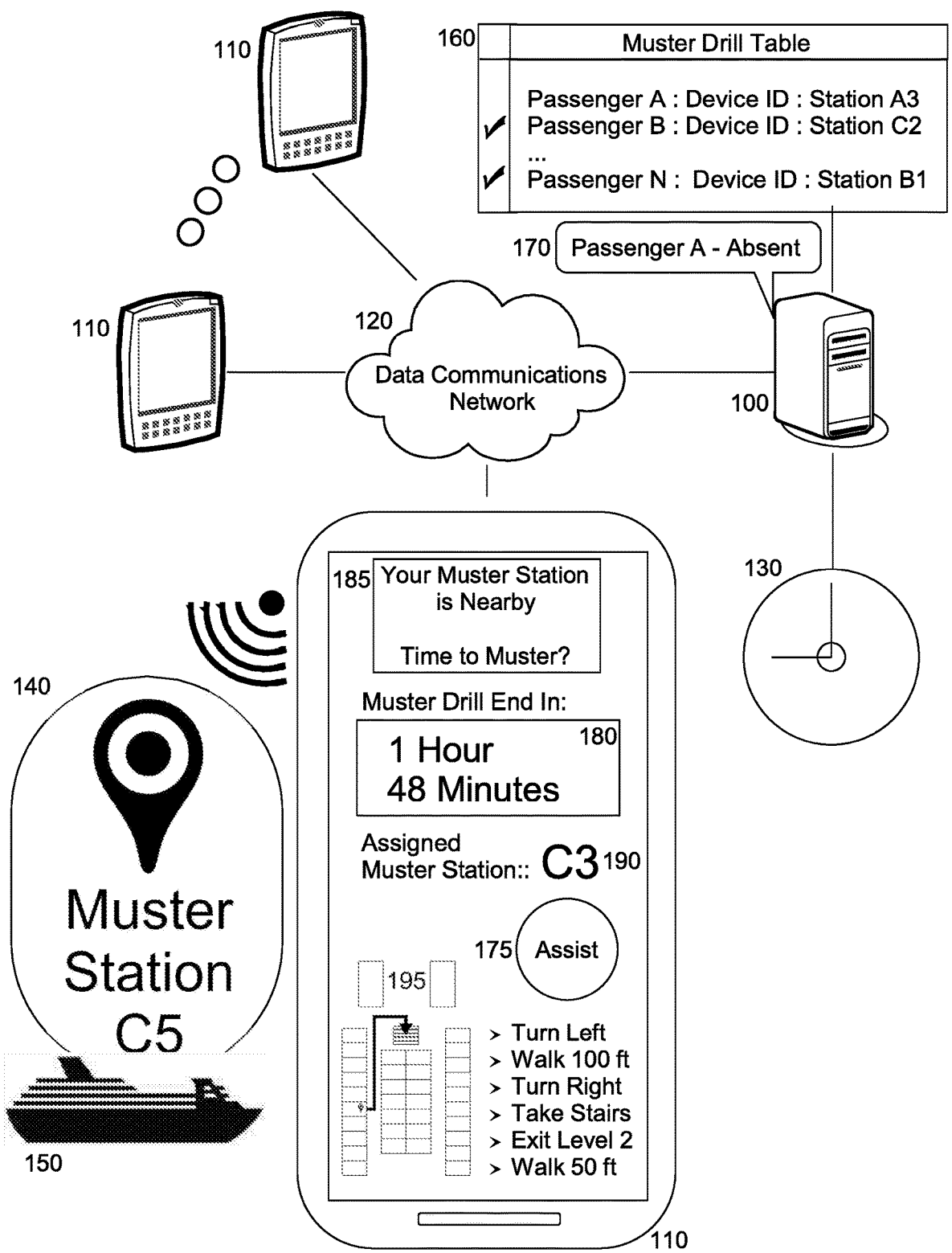
FIG. 1 is a pictorial illustration of a process for distributed muster for ocean-going vessels.

In further illustration, FIG. 1 pictorially shows a process for distributed muster for ocean-going vessels. As shown in FIG. 1, different passengers on an ocean-going vessel 150 each are registered in a muster drill table 160 in connection with a device identifier for a corresponding mobile device 110 and an assigned muster station 140. Host computing system 100 then transmits to each of the mobile devices 110 over data communications network 120 a correspondingly assigned one of a multiplicity of muster stations 140 on board the vessel 150. Subsequently, host computing system 100 initiates timer 130 defining a period for a muster drill during which period each of the passengers must check into a correspondingly assigned one of the muster stations 140. As such, the host computing system 100 directs each of the mobile devices 110 to display in a user interface both an indication 180 of the assigned one of the muster stations 140, and also a countdown indication 180 of the remaining time in the period defined by the timer 130.

In this regard, during the period defined by the timer 130, as each mobile device 110 is sensed within a geographical area corresponding to an assigned one of the muster stations 140, an entry in the muster drill table 160 is provided indicating that a corresponding one of the passengers has completed muster. For instance, the mobile device 110 may include short range wireless communications adapted to communicate with a receiver disposed within the geographical area so as to indicate a presence of the mobile device 110 at the assigned one of the muster stations 140. Alternatively, a bar code displayed in the user interface can be scanned at a kiosk disposed within the assigned one of the muster stations 140. As yet another alternative, an identification card or bracelet can be scanned at a kiosk within the assigned one of the muster stations 140. In this way, at the conclusion of the muster drill defined by the timer 130, a list 170 of those of the passengers who have not completed muster can be displayed in the host computing system 100.

Optionally, during the period defined by the timer 130 for the muster drill, a navigation path 195 may be computed for each of the passengers as between a contemporaneous location of each of the mobile devices 110 and an assigned one of the muster stations 140. The navigation path 195 then may be displayed in the user interface of each of the mobile devices 110 along with correspondent navigation instructions. As another option, a button 175 may be disposed within the user interface of each of the mobile devices 110 and the button 175 may be configured to message the host computing system 100 with a request for assistance. In response to the request, the host computing system 100 locates the corresponding mobile device 110 and messages a crew member device (not shown) determined to be nearest to a location of the mobile device 100 with the identity of an associated passenger and the location of the corresponding mobile device 100.

Finally, as even yet another option, during the period defined by the timer 130, whenever one of the mobile devices 110 is detected to be within proximity of the assigned muster station 140, a prompt 185 is generated in the user interface inviting the corresponding passenger to enter a geographical area corresponding to the assigned muster station 140. More particularly, as each passenger traverses portions of the vessel 150 during the muster drill, it can be determined that a corresponding one of the mobile devices 110 comes within proximity of an assigned one of the muster stations 140. In the event that a mobile device 110 is found to be within proximity of the assigned one of the muster stations 140, but outside of the geographical area defining the assigned one of the muster stations 140, a prompt 185 is presented encouraging the associated passenger to take advantage of the proximity by performing muster as a matter of convenience.

Figure 2:
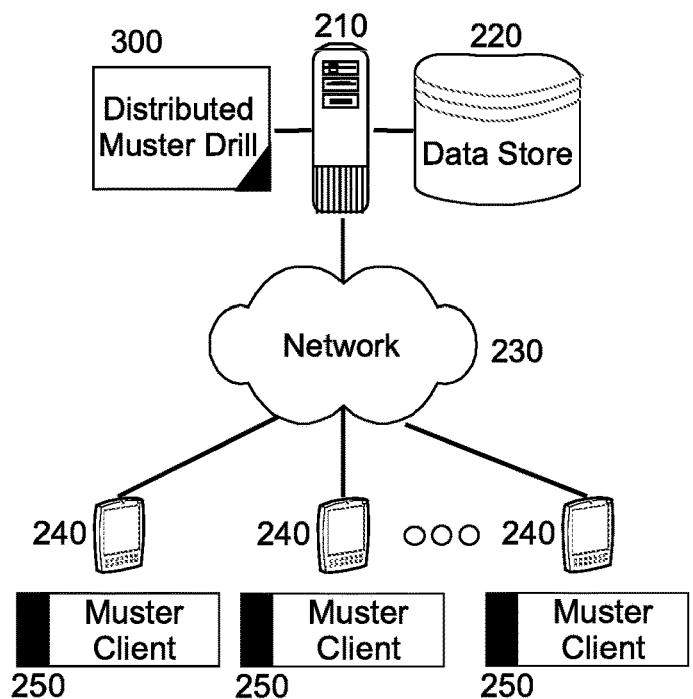
FIG. 2 is a schematic illustration of a data processing system configured for distributed muster for ocean-going vessels; and, FIG. 3 is a flow chart illustrating a process for distributed muster for ocean-going vessels.

The process described in connection with FIG. 1 may be implemented within a computer data processing system. In further illustration, FIG. 2 schematically shows a data processing system configured for distributed muster for ocean-going vessels. The system includes a host computing system 210 that includes one or more computers, each with memory and at least one processor. The host computing system 210 further includes a data store 220 adapted to store therein different records of data. As well, the host computing system 210 is communicatively coupled to different mobile devices 240 over computer communications network 230.

Of note, the host computing system 210 supports the execution in memory of a distributed muster drill module 300. The module 300 includes computer program instructions enabled during execution in the memory of the host computing system 210 to communicate with a muster client 250 in each of the mobile devices 240. Each muster client 250 is a computer program operable to receive directives from the program instructions of the distributed muster drill module 300 and to render a user interface within the mobile computing device 240. The program instructions further are enabled during execution to transmit to each of the muster clients 250, an assigned muster station and to record a record for each corresponding one of the mobile devices 240 a record correlating a passenger with the corresponding one of the mobile devices 240, and the assigned muster station.

The program instructions even yet further are enabled during execution to initiate a timer defining a period of time during which a muster drill is to be conducted, and to direct each of the muster clients 250 to display a countdown timer along with an indication of an assigned one of the muster stations. During the period of time defined by the timer, the program instructions yet further are enabled to receive different indications of different ones of the mobile devices 240 coming within a geographical location defining a correspondingly assigned one of the muster stations. In response, the program instructions are enabled to record in the data store an indication that each corresponding passenger associated with the mobile devices 240 has completed muster in accordance with the muster drill. Finally, at the conclusion of the period of time defined by the timer, the program instructions are enabled to identify in the data store 220 ones of the mobile devices 240 not determined to have come within a geographical location defining a correspondingly assigned one of the muster stations and to display associated ones of the passengers as having not completed muster during the muster drill.

Figure 3:
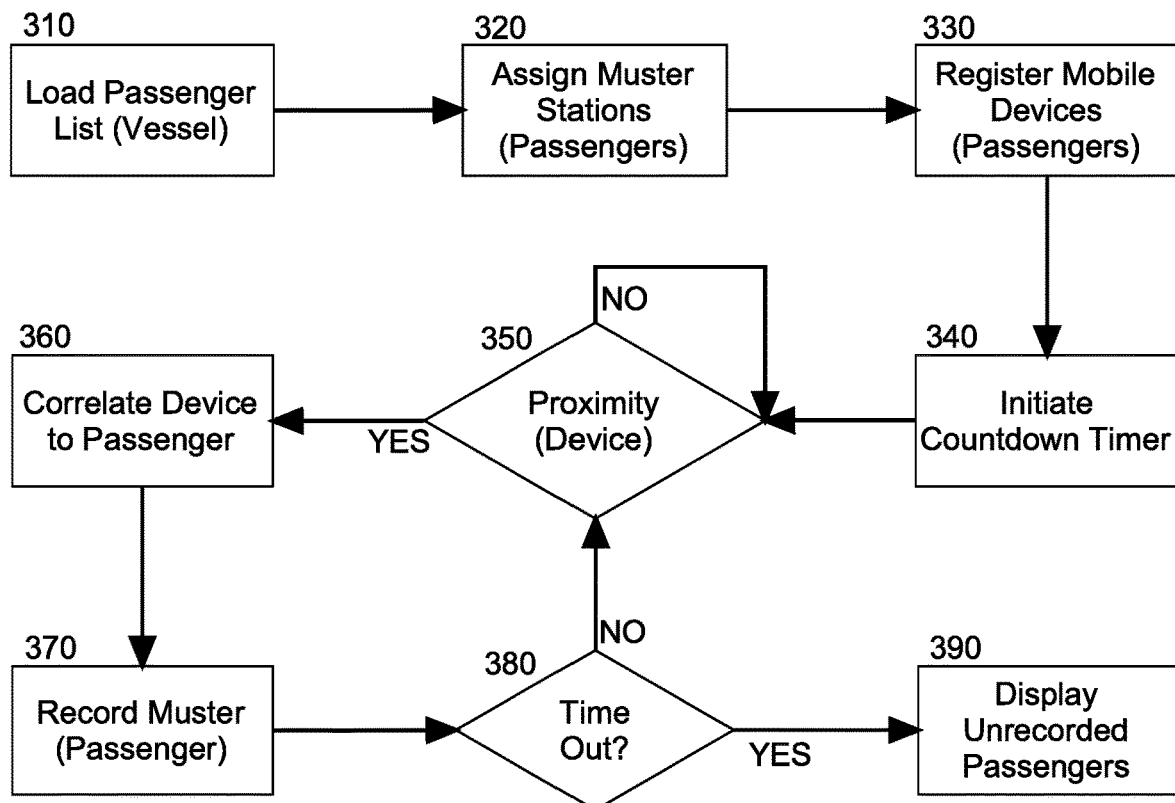

In even yet further illustration of the operation of the distributed muster drill module 300, FIG. 3 is a flow chart illustrating a process for distributed muster for ocean-going vessels. Beginning in block 310, a passenger list for a selected ocean-going vessel is loaded into memory of the host computing system and in block 320 each of the passengers are assigned in a table a respective one of a multiplicity of different muster stations on the ocean-going vessel. As well, in block 330 an identifier for a corresponding mobile device is recorded in the table in connection with each passenger. Thereafter, a countdown timer defining a period for a muster drill is initiated in block 340.

In block 350, it is determined if any of the mobile devices has come within a geographical area defining a muster station associated with the mobile device. If so, in block 360 the mobile device is correlated to a particular one of the passengers in reference to the table and in block 370, a presence of the passenger at the correct muster station is recorded in the table. Thereafter, in decision block 380, so long as the period defined by the timer has not yet expired, the process returns ton decision block 350. But, in decision block 380 if the period defined by the timer has expired, then in block 390, a list of those passengers in the table not recorded as having completed muster are displayed in the host computing system.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for distributed muster for ocean-going vessels, the method comprising:

associating in memory of a computing system, each of different mobile computing devices both with a corresponding passenger amongst a set of passengers of the one of the multiplicity of the ocean-going vessels, and also with an assigned one of a multiplicity of muster locations of one of a multiplicity of ocean-going vessels;

streaming over a computer communications network to selected ones of the passengers in the set, a muster safety video and recording in a video review database, each one of the passengers computed to have reviewed the muster safety video;

initiating a time period in memory of the computing system during which a muster drill must be completed by all of the passengers in the set for the one of the multiplicity of the ocean-going vessels;

during the time period, as each one of the mobile devices is sensed within a geographically defined area of a correspondingly assigned different one of the muster locations, recording in the memory a visitation by the corresponding passenger of the one of the mobile devices to the correspondingly assigned different one of the muster stations; and, subsequent to a lapsing of the time period indicating a completion of the muster drill, querying the video review database to determine those of the passengers not having been recorded as having reviewed the muster safety video, and displaying in a display of the computing system, a listing of any of the set of passengers not recorded in the memory as having both visited a correspondingly assigned different one of the muster stations and also having reviewed the muster safety video.

2. The method of claim 1, further comprising:

detecting a proximity of one of the mobile devices to a corresponding one of the muster locations assigned to one of the set of passengers associated with the one of the detected one of the mobile devices while the one of the mobile devices remains outside of the geographically defined area of the corresponding one of the muster locations; and, directing a prompting in a user interface of a smart phone of the one of the set of passengers of a location of the corresponding one of the muster locations.

3. The method of claim 1, wherein at least one of the mobile devices comprises a scannable card.

4. The method of claim 1, wherein at least one of the mobile devices comprises a scannable wearable.

5. The method of claim 1, further comprising:
locating a position of each one of the mobile devices during the period;
computing for each one of the mobile devices, a navigation route from the position to the correspondingly assigned different one of the muster locations; and,
for each one of the mobile devices, displaying the navigation route in a user interface of a smart phone of the corresponding passenger.

6. A data processing system adapted for distributed muster for ocean-going vessels, the system comprising:
a host computing system comprising one or more computers, each comprising memory and at least one processor, and communicatively coupled over a computer communications network to a multiplicity of different mobile devices;
a data store coupled to the host computing system, the data store storing in a database, a set of records, each of the records associating a passenger on a specific ocean-going vessel both with a corresponding one of the mobile devices, and also a particular one of a multiplicity of muster locations on the specific ocean-going vessel; and,
a distributed muster module comprising computer program instructions executing in the memory of the host computing system, the computer program instructions performing:
associating in memory of a computing system, each of different mobile computing devices both with a corresponding passenger amongst a set of passengers of the one of the multiplicity of the ocean-going vessels, and also with an assigned one of a multiplicity of muster locations of one of a multiplicity of ocean-going vessels;
streaming over a computer communications network to selected ones of the passengers in the set, a muster safety video and recording in a video review database, each one of the passengers computed to have reviewed the muster safety video;
initiating a time period in memory of the computing system during which a muster drill must be completed by all of the passengers in the set for the one of the multiplicity of the ocean-going vessels;
during the time period, as each one of the mobile devices is sensed within a geographically defined area of a correspondingly assigned different one of the muster locations, recording in the memory a visitation by the corresponding passenger of the one of the mobile devices to the correspondingly assigned different one of the muster stations; and,
subsequent to a lapsing of the time period indicating a completion of the muster drill, querying the video review database to determine those of the passengers not having been recorded as having reviewed the muster safety video, and displaying in a display of the computing system, a listing of any of the set of passengers not recorded in the memory as having both visited a correspondingly assigned different one of the muster stations and also having reviewed the muster safety video.

7. The system of claim 6, wherein the program instructions further perform:
detecting a proximity of one of the mobile devices to a corresponding one of the muster locations assigned to one of the set of passengers associated with the one of the detected one of the mobile devices while the one of the mobile devices remains outside of the geographically defined area of the corresponding one of the muster locations; and,
directing a prompting in a user interface of a smart phone of the one of the set of passengers of a location of the corresponding one of the muster locations.

8. The system of claim 6, wherein at least one of the mobile devices comprises a scannable card.

9. The system of claim 6, wherein at least one of the mobile devices comprises a scannable wearable.

10. The system of claim 6, wherein the program instructions further perform:
locating a position of each one of the mobile devices during the period;
computing for each one of the mobile devices, a navigation route from the position to the correspondingly assigned different one of the muster locations; and,
for each one of the mobile devices, displaying the navigation route in a user interface of a smart phone of the corresponding passenger.

11. A computer program product for distributed muster for ocean-going vessels, the computer program product including a non-transitory computer readable storage medium having program instructions embodied therewith, the program instructions executable by a device to cause the device to perform a method including:
associating in memory of a computing system, each of different mobile computing devices both with a corresponding passenger amongst a set of passengers of the one of the multiplicity of the ocean-going vessels, and also with an assigned one of a multiplicity of muster locations of one of a multiplicity of ocean-going vessels;
streaming over a computer communications network to selected ones of the passengers in the set, a muster safety video and recording in a video review database, each one of the passengers computed to have reviewed the muster safety video;
initiating a time period in memory of the computing system during which a muster drill must be completed by all of the passengers in the set for the one of the multiplicity of the ocean-going vessels;
during the time period, as each one of the mobile devices is sensed within a geographically defined area of a correspondingly assigned different one of the muster locations, recording in the memory a visitation by the corresponding passenger of the one of the mobile devices to the correspondingly assigned different one of the muster stations; and,
subsequent to a lapsing of the time period indicating a completion of the muster drill, querying the video review database to determine those of the passengers not having been recorded as having reviewed the muster safety video, and displaying in a display of the computing system, a listing of any of the set of passengers not recorded in the memory as having both visited a correspondingly assigned different one of the muster stations and also having reviewed the muster safety video.

12. The computer program product of claim 11, wherein the method further comprises:
detecting a proximity of one of the mobile devices to a corresponding one of the muster locations assigned to one of the set of passengers associated with the one of the detected one of the mobile devices while the one of the mobile devices remains outside of the geographically defined area of the corresponding one of the muster locations; and, directing a prompting in a user interface of a smart phone of the one of the set of passengers of a location of the corresponding one of the muster locations.

13. The computer program product of claim 11, wherein at least one of the mobile devices comprises a scannable card.

14. The computer program product of claim 11, wherein at least one of the mobile devices comprises a scannable wearable.

15. The computer program product of claim 11, wherein the method further comprises:

locating a position of each one of the mobile devices during the period;

computing for each one of the mobile devices, a navigation route from the position to the correspondingly assigned different one of the muster locations; and, for each one of the mobile devices, displaying the navigation route in a user interface of a smart phone of the corresponding passenger.

\* \* \* \* \*